March 22, 1960 — J. A. FERRO ET AL — 2,929,268
BI-DIRECTIONAL INCREMENTAL DRIVE MECHANISM
Filed Sept. 30, 1957
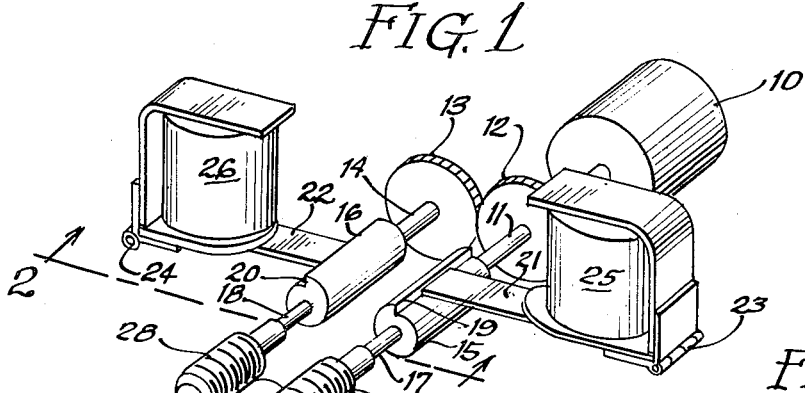
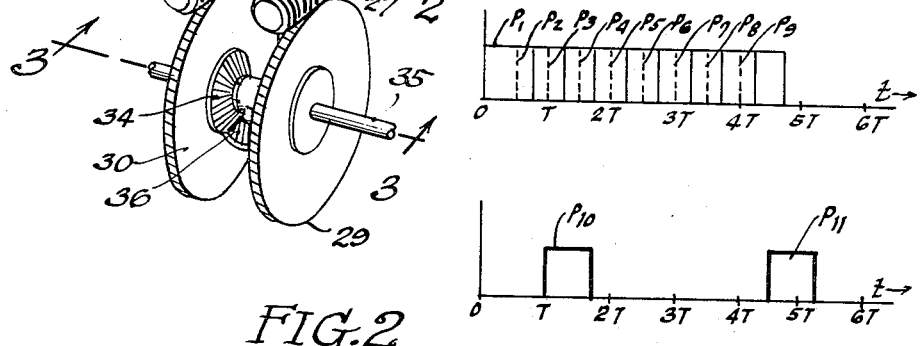
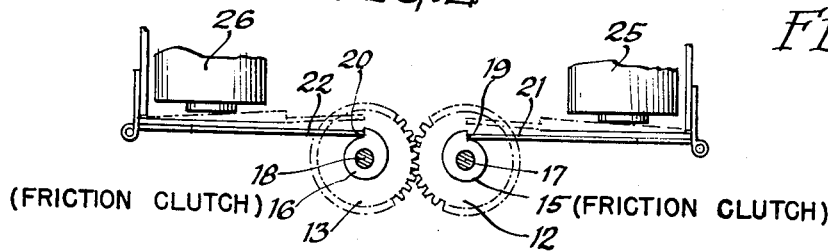
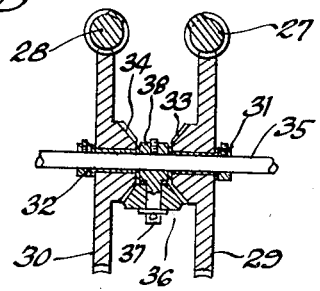
Joseph A. Ferro
Everett L. Markowski
INVENTORS
BY
Ooms, McDougall, Williams & Hersh
Attorneys

UNITED STATES PATENT OFFICE 2,929,268
Patented Mar. 22, 1960

2,929,268

BI-DIRECTIONAL INCREMENTAL DRIVE MECHANISM

Joseph A. Ferro, Park Ridge, and Everett L. Markowski, Morton Grove, Ill., assignors to Cook Electric Company, Chicago, Ill., a corporation of Delaware Application September 30, 1957, Serial No. 687,097

3 Claims. (Cl. 74—674)

This invention relates to the field of mechanical drive mechanisms and is particularly concerned with a bi-directional drive mechanism for use in servo systems and the like wherein advancement of a driven member in discrete incremental steps is desired.

In various important applications wherein servo mechanisms are used, it is essential that movement of the driven element occur in discrete increments of predetermined magnitude. To provide a bi-directional drive mechanism which will achieve such performance is the major object of the present invention.

Broadly speaking, incremental advance of the driven element in a servo system can be accomplished by an escapement mechanism, but this type of structure is subject to rapid wear and hence to relatively short life, since each increment of movement is accompanied by the engagement of moving parts, such as a pawl and toothed wheel. When the load is extremely light, as in a clock or similar device, the rate of wear of the moving parts can be made acceptably low, but it becomes a serious problem when the load is a heavy one. Hence an important object achieved by the present invention is the provision of an incremental drive mechanism which will move continuously, without escapement action, in response to appropriate "orders" from the servo mechanism, but which will always end its movement at some one of a plurality of discrete predetermined positions.

A further object of the invention is to provide a drive mechanism which will advance or retract a driven element, such as an output shaft, responsively to a train of electric impulse signals, the quantity of movement being in all cases a multiple of a predetermined increment.

Other objects and advantages of the invention will appear from the following detailed description of a typical embodiment thereof.

In the appended drawing, Figure 1 is a perspective view of a typical drive mechanism embodying the principles of the invention. Fig. 1 is diagrammatic in the sense that it shows only the essential operative parts of the apparatus, without showing the fixed supports, shaft bearings, and other conventional parts which in practice will be therewith associated. Fig. 2 is a side elevation view, partly in section, taken in vertical section along the line 2—2 of Fig. 1. Fig. 3 is a vertical sectional view along the line 3—3 of Fig. 1. Figs. 4 and 5 are graphs showing respectively the pulse-signal conditions under which the drive mechanism will run continuously and the pulse-signal conditions under which the drive mechanism will move the driven element in single incremental steps.

Referring now to Fig. 1, we show therein an electric motor 10 which turns a primary driving shaft 11. Motor 10 may, according to the requirements of the application, include a step-down gear box to provide a suitable speed of rotation for shaft 11. Rigidly secured to shaft 11 is a spur gear 12 which meshes with a second spur gear 13 of equal size. Gear 13 is carried by and is rigidly secured to a secondary driving shaft 14. As will be apparent from Fig. 1, the arrangement just described provides a pair of driving shafts 11 and 14 which rotate continuously at equal speeds but in opposite directions.

The shafts 11 and 14 terminate respectively in a pair of spring-loaded friction clutches 15 and 16, having respectively output shafts 17 and 18.

The outer housing surfaces of the clutches 15 and 16 are formed in the shape of cylindrical cams, having square radial engaging surfaces 19 and 20 respectively. The engaging surfaces 19 and 20 are formed on the clutches 15 and 16 in opposite sense, as is shown clearly in Fig. 1. The housings of the clutches are respectively locked to the output shafts 17 and 18 so that they rotate therewith. Since the internal clutch mechanism of the clutches 15 and 16 may be of the conventional over-running type or of any other suitable type, such mechanism is not shown in detail in the drawings.

Mounted outboard of the clutches 15 and 16 are a pair of pawls 21 and 22, pivoted at their outer ends on spring-loaded hinges 23 and 24 respectively. The inner ends of the pawls 21 and 22 respectively bear on the cam surfaces of the clutches 15 and 16, being so positioned as to normally engage the radial engaging surfaces 19 and 20 of the clutches. A solenoid 25 is mounted above the pawl 21, solenoid 25 being operative upon energization by electric current to raise pawl 21 into the dotted-line position of Fig. 2, where it is out of engagement with the cam face 19 of clutch 15. A similar solenoid 26 is mounted above pawl 22, energization of solenoid 26 being operative to raise the pawl 22 into the dotted-line position of Fig. 2, where it is out of engagement with the cam face 20 of clutch 16.

The output shafts 17 and 18 respectively terminate in worms 27 and 28, which cooperate in turn with worm gears 29 and 30. Worm gears 29 and 30 are mounted for free rotation on the output shaft 35, being held in position thereon by suitable collars 31 and 32.

The inner faces of worm gears 29 and 30 are formed to define a pair of beveled differential gears 33 and 34, which cooperate with a third beveled gear 36, which is mounted for free rotation on a stub shaft 37, as shown in Fig. 3. Stub shaft 37 is mounted by means of a collar 38 on the output shaft 35, collar 38 being secured, by a key or other suitable means, to shaft 35 so as to rotate therewith. It will be understood that the stub shaft 37 is disposed with its axis intersecting the axis of shaft 35 at right angles.

From our discussion of the objects of this invention, it will be understood that our drive mechanism is intended for use with a servo device, which may be of conventional character, having as its function the maintenance of positional correspondence between the output shaft 35 and a master servo element (not shown). It is contemplated that the servo mechanism, which does not of itself form any part of this invention, will indicate lack of positional correspondence, sometimes called servo unbalance, by feeding electrical current pulses to one or the other of solenoids 25 or 26, depending upon the direction of servo unbalance existing. Electric motor 10 runs continuously and hence causes shafts 11 and 14 to rotate continuously at a constant speed, so that a definite predetermined time interval will be required for a single complete rotation of clutch 15 or 16, as the case may be, whenever it is free to rotate in step with its associated driving shaft 11 or 14. In the following discussion of the operation of our invention, we shall designate this time required for a single clutch rotation by the symbol T.

For most effective operation of our drive mechanism, the associated servo mechanism should supply current pulses to the solenoids 25 and 26 which have durations greater than $\frac{1}{2}T$ and preferably about $\frac{3}{4}T$.

The maximum repetition rate of such pulses should be somewhat greater than the frequency of rotation of the driving shafts—that is, should be somewhat greater than $1/T$. A typical maximum repetion rate for the current pulses fed to the solenoids by the servo system may be twice the frequency of revolution of the shafts 11 and 14. If this condition be met, the pulses, when being fed to one of the solenoids at the maximum rate, will overlap one another, the succeeding pulse commencing before the end of the preceding one.

In describing the operation of our drive mechanism responsively to current pulses from the servo system, we shall first consider the case in which a relatively large positional discrepancy or servo unbalance exists between the master servo element and the output shaft 35. Under these conditions, the corrective current impulses will be fed to the appropriate solenoid 25 or 26 at the maximum rate. For illustrative purposes, we shall assume that the unbalance is in such a direction that solenoid 25 is supplied with corrective pulses.

The behavior of pawl 21 under the conditions just described is graphically illustrated in Fig. 4, wherein the abscissa represents time, marked off in intervals equal to T, and in which the ordinate represents the position of pawl 21, raised or lowered, as the case may be.

When the first pulse $P_1$ energizes the solenoid 25, the pawl 21 is raised, freeing the clutch 15 and permitting shaft 17 to rotate in step with shaft 11. This of course causes the worm 27 to turn at an equal rate, and worm gear 29 thereupon starts to rotate. Since worm gear 30 and beveled gear 34 are locked against rotation by the pawl 22, the rotation of gear 29 causes beveled gear 36 to ride around the locked gear 34, resulting in rotation of the output shaft 35.

Since the servo unbalance is large, pulse $P_2$ commences before pulse $P_1$ ends, with the result that pawl 21 remains in its raised position, leaving clutch 15 free to rotate continuously. Thus output shaft 35 continues to turn at a uniform rate until the servo unbalance has been eliminated and the shaft 35 has been brought into positional correspondence with the master servo element. While this is taking place, the successive signal pulses $P_3$, $P_4$, ... $P_9$ follow one another in time-overlapping relation, so that the pawl 21 remains out of engagement with the cam surface of clutch 15.

When balance occurs, corrective current pulses will cease to flow into solenoid 25, and the pawl 21 will thereupon drop to its normal position under the urging of the spring in hinge 23. Thereupon the clutch 15 will complete the cycle of rotation in which it is then engaged, but will be brought to a halt when the cam face 19 comes into engagement with the pawl 21. At that point, the shaft 17 and the output shaft 35 will stop turning.

From the foregoing, it will be understood that the total movement of output shaft 35 will always equal an integral number of increments represented by complete revolutions of the driven shafts 17 and 18. No fractional increments of movement can ever take place.

When a small unbalance occurs, or when unbalance is being introduced into the servo system at a slow rate, the signal pulses will not normally succeed one another in time-overlapping relation. This condition is graphically illustrated in Fig. 5. Suppose, at time T, the servo unbalance is sufficient to produce a signal pulse through solenoid 25, but is of such small magnitude that it can be corrected by a single incremental movement of output shaft 35. Under those circumstances, the single pulse $P_{10}$ will raise the pawl 21, permitting the clutch 15 to engage and rotate the shaft 35 through a single increment. Before completion of a full revolution of clutch 15, however, the pawl 21 will drop, and at time 2T the cam face 19 will engage the pawl 21 and movement of the output shaft 35 will immediately cease. Later, as unbalance in the servo system accumulates, it will eventually become great enough to produce another signal impulse in the solenoid 25, such impulse being shown on Fig. 5 as $P_{11}$. That pulse will again result in freeing of the clutch 15 and movement of the output shaft 35 through another increment of rotation in the manner already described.

Unbalance, of course, may occur in either direction. Whenever restoration of balance in the system requires rotation of output shaft 35 in the opposite direction, the servo mechanism will feed appropriate pulses to solenoid 26, and the resulting freeing of clutch 16 will cause the output shaft 35 to rotate in the opposite direction.

While we have in this specification described in considerable detail a typical embodiment of our invention, it should be understood that such description is illustrative only. Numerous changes and modifications of the structure shown can be made by persons skilled in the art without departing from the spirit of our invention. It is therefore our desire that the scope of our invention be determined pirmarily by reference to the appended claims.

We claim:

1. A bi-directional incremental drive mechanism for a servo system wherein system unbalance is signalled by electric impulses, comprising, in combination, a motor adapted to run continuously, a pair of driving shafts, means coupling said shafts to said motor operative to cause said shafts to rotate in opposite directions, two friction clutches having input portions and output portions, the input portions of each of said clutches being respectively connected to said driving shafts for rotation therewith, a pair of driven shafts respectively connected to and driven by the output portions of said clutches, a cam means rigidly secured to each of said driven shafts for rotation therewith, each of said cam means having a radial ledge adapted to abut and engage a pawl for blocking rotation of the driven shaft associated with such cam means, a pawl for each of said cam means, said pawls being mounted for movement between an advanced position and a retracted position adjacent said cam means and bearing against said cam means when in advanced position, each of said driven shafts being free to rotate unimpededly when its associated pawl is in its retracted position, biasing means for said pawls holding the same normally in advanced position, means for each of said pawls for temporarily retracting the same responsively to servo signals, an output shaft, and drive means interconnecting said output shaft and said two driven shafts operative to rotate said output shaft in one direction responsively to rotation of one of said driven shafts and in the opposite direction responsively to rotation of the other of said driven shafts.

2. A bi-directional incremental drive mechanism for a servo system, comprising in combination a motor adapted to run continuously, a pair of driving shafts, means coupling said shafts to said motor operative to cause said shafts to rotate in opposite directions, a pair of torque-responsive clutches each having an input portion and an output portion, the input portions of said clutches being respectively connected to said driving shafts for rotation therewith, a pair of driven shafts respectively connected to and driven by the output portions of said clutches, means normally operative to block rotation of said driven shafts at predetermined angular positions thereof, means operatively associated with each of said blocking means for temporarily deactivating either of said blocking means responsively to servo signals, each of said blocking means being operative when deactivated to leave its associated shaft free to rotate unimpededly, an output shaft, and drive means interconnecting said output shaft and said driven shafts operative to rotate said output shaft in one direction responsively to rotation of one of said driven shafts and in the opposite direction responsively to rotation of the other of said driven shafts.

3. A bi-directional incremental drive mechanism for a servo system wherein system unbalance is signalled by electric impulses, comprising, in combination, a motor adapted to run continuously, a pair of driving shafts, means coupling said shafts to said motor operative to cause said shafts to rotate in opposite directions at equal speeds, two friction clutches having input portions and output portions, the input portions of each of said clutches being respectively connected to said driving shafts for rotation therewith, a pair of driven shafts respectively connected to and driven by the output portions of said clutches, a cam means rigidly secured to each of said driven shafts for rotation therewith, each of said cam means having a radial ledge adapted to abut and engage a pawl for blocking rotation of the driven shaft associated with such cam means, a pawl for each of said cam means, said pawls being mounted for movement between an advanced position and a retracted position adjacent said cam means and bearing against said cam means when in advanced position, each of said driven shafts being free to rotate unimpededly when its associated pawl is in its retracted position, biasing means for said pawls holding the same normally in advanced position, means for each of said pawls for temporarily retracting the same responsively to servo signals, an output shaft, a worm rigidly secured to each of said driven shafts for rotation therewith, a pair of worm gears respectively mounted to be driven by said worms, and a differential gear assembly interconnecting said output shaft and said worm gears operative to rotate said output shaft in one direction when one of said worm gears is rotating and in the opposite direction when the other of said worm gears is rotating.

References Cited in the file of this patent

UNITED STATES PATENTS

| | | |
|---|---|---|
| 1,377,844 | McCutchen | May 10, 1921 |
| 1,681,307 | Packard | Aug. 21, 1928 |
| 2,147,939 | Tislken | Feb. 21, 1939 |
| 2,451,525 | Webb | Oct. 19, 1948 |
| 2,603,131 | Muller | July 15, 1952 |
| 2,668,012 | Lindeman | Feb. 2, 1954 |
| 2,911,843 | Mitchell | Nov. 10, 1959 |

FOREIGN PATENTS

| | | |
|---|---|---|
| 656,921 | Great Britain | Sept. 5, 1951 |